United States Patent [19]

Peuckert et al.

[11] Patent Number: 5,162,272
[45] Date of Patent: Nov. 10, 1992

[54] SINTERABLE CERAMIC POWDER, PROCESS FOR ITS PRODUCTION, SILICON NITRIDE CERAMIC PRODUCED THEREFROM, PROCESS FOR ITS PRODUCTION AND ITS USE

[75] Inventors: Marcellus Peuckert, Hofheim am Taunus; Tilo Vaahs, Kelkheim; Martin Brück, Hofheim am Taunus; Hans-Jerg Kleiner, Kronberg/Taunus; Ralf Riedel, Leinfelden-Echterdingen; Martin Sehr, Stuttgart; Günter Petzow, Leinfelden-Echterdingen, all of Fed. Rep. of Germany

[73] Assignee: Hoechst Aktiengesellschaft, Frankfurt am Main, Fed. Rep. of Germany

[21] Appl. No.: 498,266

[22] Filed: Mar. 23, 1990

[30] Foreign Application Priority Data

Mar. 25, 1989 [DE] Fed. Rep. of Germany ....... 3909978

[51] Int. Cl.$^5$ ............................................. C04B 35/58
[52] U.S. Cl. ..................................................... 501/97
[58] Field of Search ...................... 501/96, 97; 264/65; 528/28, 30

[56] References Cited

U.S. PATENT DOCUMENTS

| | | | |
|---|---|---|---|
| 3,853,567 | 12/1974 | Verbeek | 106/44 |
| 3,892,583 | 7/1975 | Winter et al. | 106/55 |
| 4,869,854 | 9/1989 | Takeda et al. | 264/22 |

FOREIGN PATENT DOCUMENTS

| | | |
|---|---|---|
| 266918 | 5/1988 | European Pat. Off. |
| 305759 | 3/1989 | European Pat. Off. |
| 2856593 | 9/1987 | Fed. Rep. of Germany |
| 2190764 | 2/1974 | France |

OTHER PUBLICATIONS

Saiki, G. et al, *Chem. Abs.* 108:172382r (1988).
Schwartz, K. B. et al, *Advanced Ceramic Materials* 3, 320-323 (1988).
Saiki, G. et al (II), *Chem. Abs.* 110:14358n (1989).

*Primary Examiner*—Mark L. Bell
*Assistant Examiner*—Alan Wright

[57] ABSTRACT

The invention relates to a novel sinterable ceramic powder, to its preparation and to its further processing to give a silicon nitride ceramic, and to this material itself and its use. The sinterable ceramic powder is produced by melting a polysilazane or dissolving it in an organic solvent, suspending a powdered sinter aid in this melt or solution, then pyrolyzing the melt, or the residue obtained after evaporation of the solvent, at 500° to 1600° C. in a protective gas atmosphere, the polysilazane either A) being obtainable by reacting at least one of the oligosilazanes of the formula (I)

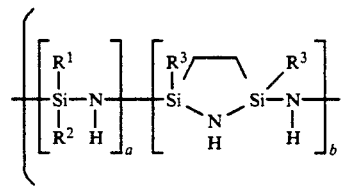
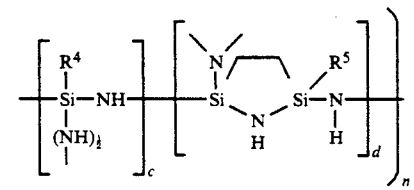

in which a, b, c and d are the mole fractions of the respective structural units and where $0 \leq a \leq 1$, $0 \leq b \leq 1$, $0 \leq c \leq 0.7$, $0 \leq d \leq 0.7$, $0.3 \leq a+b$, $c+d \leq 0.7$ and n is approximately 2 to approximately 12, with at least one of the chlorosilanes $R^6R^7SiCl_2$, $R^8SiCl_3$, $Cl_2R^9Si-CH_2CH_2-SiR^9Cl_2$ and $Cl_3Si-CH_2CH_2SiR^{10}Cl_2$ at 30° to 300° C., where, independently of one another, $R^1$, $R^2$, $R^4$, $R^6$, $R^7$ and $R^8$ are H, $C_1-C_6$-alkyl or $C_2-C_6$-alkenyl and $R^3$, $R^5$, $R^9$ and $R^{10}$ are $C_1-C_6$-alkyl or $C_2-C_6$-alkenyl, or B) having the following formula

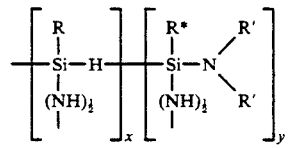

in which R and R* can be identical or different and R and R* are $C_1-C_4$-alkyl, vinyl or phenyl and R' is $C_1-C_4$-alkyl and x and y are the mole fractions of the two structural units, where $x+y=1$ and $x=0.7-0.95$.

A molded article can be formed from the ceramic powder thus obtained and a silicon nitride ceramic then produced by sintering. However, a molded article can also be formed from the solidified melt or the still unpyrolyzed residue obtained after evaporating the solvent and this article can then by pyrolyzed and sintered.

Components subject to severe mechanical, thermal and corrosive stress can be produced from the ceramic obtained.

28 Claims, No Drawings

SINTERABLE CERAMIC POWDER, PROCESS FOR ITS PRODUCTION, SILICON NITRIDE CERAMIC PRODUCED THEREFROM, PROCESS FOR ITS PRODUCTION AND ITS USE

DESCRIPTION

The invention relates to a novel sinterable ceramic powder, to its production, to its further processing to give a silicon nitride ceramic, and to this material itself and its use.

Pure $Si_3N_4$ powder can in general be densified to the theoretical density without pressure at 1850° C. or under the application of pressure at higher temperatures, in each case by addition of oxidic sinter aids such as, for example, alumina, silica, magnesia or yttria.

In contrast to this, the complete densification of $Si_3N_4/SiC$ mixed powder proves to be substantially more difficult and usually can be effected only by means of hot pressing.

A good reproducibility of the mechanical and physical properties of disperse materials depends essentially on the homogeneous distribution of the individual phases in the structure. The uniform distribution both of the disperse phase and of the sinter aid in general presents great difficulties in the conventional production of mixed ceramics from powdered $Si_3N_4$, SiC and sinter aids and requires complicated mixing and grinding processes for the corresponding powder mixtures. Processes have therefore been sought which ensure an improvement in the distribution of the different particles in the starting powders.

The deposition of the sinter aids on a ceramic powder, such as, for example, SiC powder, from a solution phase offers one possibility for more homogeneous distribution of two or more phases. For this purpose, for example, SiC powder is first dispersed in a suspending agent in which sinter aids in the form of salts, organometallic compounds or inorganic polymers are present in solution. The dissolved sinter aids are then precipitated on the SiC particles, for example by removal of the solvent (DE 2,856,593 C2). The sinter aids are then converted into the corresponding ceramic phases by thermal decomposition.

One object of the present invention is to make available a process which ensures the synthesis of a sinterable $Si_3N_4$ or $Si_3N_4/SiC$ powder in which both the $Si_3N_4$ and SiC particles and the sinter aids are extremely well distributed.

This object is achieved according to the invention in that a polymeric compound containing Si, C, H and N, a polysilazane containing organic substituents, is used as the $Si_3N_4$ or SiC source and is precipitated on a powdered sinter aid. A pyrolysis is then carried out. Such a process is already described in the unpublished German Patent Application P 3,840,773.6; a polysilazane of the formula $(CH_3SiHNH)_n(CH_3SiN)_n$ where $n=10-12$ is employed in this application.

The present invention accordingly relates to a process for the production of a sinterable ceramic powder, which comprises melting a polysilazane or dissolving it in an organic solvent, suspending a powdered sinter aid in this melt or solution, then pyrolysing the melt, or the residue obtained after evaporation of the solvent, at 500° to 1600° C. in a protective gas atmosphere, the polysilazane either A) being obtainable by reacting at least one of the oligosilazanes of the formula (I)

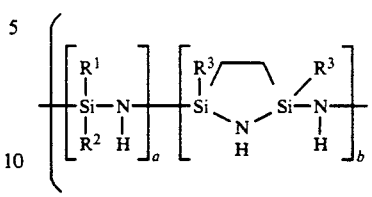

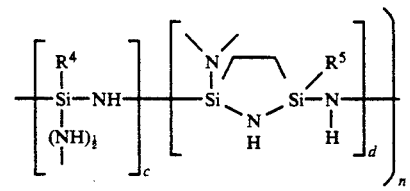

in which a, b, c and d are the mole fractions of the respective structural units and where $0 \leq a \leq 1$, $0 \leq b \leq 1$, $0 \leq c < 0.7$, $0 \leq d < 0.7$, $0.3 \leq a+b$, $c+d < 0.7$ and n is approximately 2 to approximately 12, with at least one of the chlorosilanes $R^6R^7SiCl_2$, $R^8SiCl_3$, $Cl_2R^9Si-CH_2CH_2-SiR^9Cl_2$ and $Cl_3Si-CH_2CH_2-SiR^{10}Cl_2$ at 30° to 300° C., where, independently of one another, $R^1$, $R^2$, $R^4$, $R^6$, $R^7$ and $R^8$ are H, $C_1-C_6$-alkyl or $C_2-C_6$-alkenyl and $R^3$, $R^5$, $R^9$ and $R^{10}$ are $C_1-C_6$-alkyl or $C_2-C_6$-alkenyl, or B) having the following formula

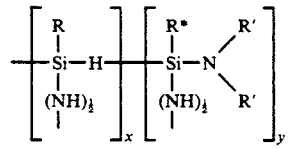

in which R and R* can be identical or different and R and R* are $C_1-C_4$-alkyl, vinyl or phenyl and R' is $C_1-C_4$-alkyl and x and y are the mole fractions of the two structural units, where $x+y=1$ and $x=0.7-0.95$.

The polysilazanes mentioned under A) contain chlorine and shall therefore also be designated as "polychlorosilazanes" below.

Of course, it is also possible to use mixtures of the polysilazanes obtained as in A) for the infiltration, or mixtures of the polysilazanes as in B), or mixtures of the polysilazanes as in A) with polysilazanes as in B).

Preferably, independently of one another, $R^1$, $R^2$, $R^4$, $R^6$, $R^7$ and $R^8$ are H, $C_1-C_3$-alkyl or $C_2-C_3$-alkenyl and $R^3$, $R^5$, $R^9$ and $R^{10}$ are $C_1-C_3$-alkyl or $C_2-C_3$-alkenyl. The case is particularly preferred in which $R^1=R^6=H$, $R^2=R^3=R^5=R^7=R^8=R^9=R^{10}=CH_3$ and, independently of one another, $R^4$ and $R^8$ are $CH_3$ or vinyl.

a, b, c and d are the mole fractions of the respective structural units, where $a+b+c+d=1$. Particularly suitable polychlorosilazanes are obtained if the starting materials used are oligosilazanes of the formula (I) for which $a=1$ or $b=1$, or mixtures of these two oligosilazanes, or oligosilazanes of the formula (I), for which $0<a<1$ and $0<b<1$ where $a+b=1$ or for which $0<a<1$ and $0<d<1$ where $a+d=1$. Of these polychlorosilazanes, those employed in the process according to the invention are, in particular, those which have not exclusively been prepared from oligosilanes of the formula (I) where a=1, and chlorosilanes of the formula $R^6R^7SiCl_2$ (as in the German Patent Application P 3,733,728.9).

In other words: if an oligosilazane of the formula (I) where a=1 is exclusively employed, it is preferably reacted with at least one of the chlorosilanes $R^8SiCl_3$, $Cl_2R^9Si-CH_2CH_2-SiR^9Cl_2$ or $Cl_3Si-CH_2-H_2-SiR^{10}Cl_2$. If, on the other hand, an oligosilazane of the formula (I) where a=1 is employed in a mixture with other oligosilazanes amongst those mentioned, the chlorosilane $R^6R^7SiCl_2$ is equally as suitable for the reaction to give the polychlorosilazane as the three chlorosilazanes mentioned.

Very particularly preferentially, polychlorosilazanes as in A) are employed which have been obtained from an oligosilazane (I) where a=0.9-0.97, b=0.1-0.03 (c=d=0) and at least one of the four chlorosilanes mentioned (in particular $CH_3SiCl_3$) or from an oligosilazane (I) where a=0.9-0.97, d=0.1-0.03 (b=c=0) and at least one of the four chlorosilanes mentioned (in particular $CH_3SiCl_3$). If $CH_3SiCl_3$ is employed as the chlorosilane, the molar ratio oligosilazane:$CH_3SiCl_3$ is preferably 1:0.1 to 1:1.5.

The polychlorosilazanes and their preparation have already been described in the German Patent Applications P 3,733,728.9, P 3,840,770.1, P 3,840,774.4, P 3,840,775.2, P 3,840,777.9 and P 3,840,779.5.

The oligosilazanes of the formula (I) employed as starting materials for the polychlorosilazanes can be obtained by reacting excess ammonia with a starting material which contains at least one of the two components (II) $R^1R^2SiCl_2$ and (III) $Cl_2R^3Si-CH_2-H_2-SiR^3Cl_2$, and in addition can contain one or both of the components (IV) $R^4SiCl_3$ and (V) $Cl_3Si-CH_2-H_2-SiR^5Cl_2$, at $-70°$ C. to $+100°$ C., where, independently of one another, $R^1$, $R^2$ and $R^4$ are H, $C_1-C_6$-alkyl or $C_2-C_6$-alkenyl and $R^3$ and $R^5$ are $C_1-C_6$-alkyl or $C_2-C_6$-alkenyl and the molar percentage proportion of (II) or (III) or their mixture in the starting material is at least 30%.

The chlorosilanes (II) $R^1R^2SiCl_2$ and (IV) $R^4SiCl_3$ employed as starting materials for the oligosilazanes are commercially available, and the ethylene-bridged species (III) and (V) are accessible by hydrosilylation of commercially available $R^3HSiCl_2$ and ethyne, or by hydrosilylation of vinyltrichlorosilane and $R^5SiCl_2$ (see experimental report).

In order to prepare the oligosilazanes, the chlorosilanes are preferably initially introduced in a solvent, which is inert towards the reactants - chlorosilanes and $NH_3$ -, and mixed with ammonia until saturation is reached, which occurs when all the SiCl functions are substituted by NH groups.

Suitable solvents for this reaction are, for example, saturated aliphatic or aromatic hydrocarbons such as n-pentane, cyclohexane, toluene, chlorinated hydrocarbons such as chloroform or chlorobenzene, or ethers such as diethyl ether or THF.

If appropriate, the preparation of the oligosilazanes can also be carried out under reduced pressure, but also at pressures of 1 to 100 bar. Ammonia can be metered in as a gas or as a liquid. The process can also be made continuous.

In the reaction of the oligosilazanes to give the polychlorosilazane, the molar ratio of the reactants chlorosilane:monomer unit of the oligosilazane (n=1) is preferably about 0.1:1 to about 1.5:1, in particular about 0.1:1 to about 0.7:1.

In order to react the reactants with one another, the oligosilazane(s) is (are) preferably initially introduced and at least one of the chlorosilanes mentioned is added. As the reaction is exothermic, the temperature is preferably initially kept at 30° to 50° C. during the adding together of the reactants. The mixture is then heated to temperatures of 100° to 300° C., preferably to 120° to 250° C.

After completion of the reaction, the residual more easily volatile compounds are in general removed from the reaction vessel by applying vacuum.

The $NH_4Cl$ likewise formed during the reaction mostly sublimes off from the reaction mixture in the course of the reaction. Any residual $NH_4Cl$ can be separated off from the polychlorosilazane produced by extraction with an inert organic solvent, such as n-hexane, toluene or ether.

The reaction time depends on the rate of heating and the reaction temperature. In general, a reaction time of 3 to 7 hours is sufficient.

It is also possible to carry out the reaction in an organic solvent. Suitable solvents are those which are inert towards the reactants and have a sufficiently high boiling point, i.e., for example, saturated aliphatic or aromatic hydrocarbons such as n-decane, decalin, xylene, toluene, chlorinated hydrocarbons such as chlorobenzene, or ethers such as dibenzyl ether or diethylene glycol diethyl ether. When using a solvent in which the $NH_4Cl$ formed in insoluble, the latter can be separated off by filtration. The polychlorosilazanes are then obtained by distilling off the solvent under reduced pressure.

If appropriate, the process can also be carried out under reduced pressure. It can also be carried out at pressures in the range from 1 to 10 atmospheres.

The polychlorosilazanes obtained are already molten at about 50° to 200° C. They combine a high ceramic yield (on the subsequent thermal decomposition) with a low melting temperature; this effect can be optimized by mixing various polychlorosilazanes.

The polysilazanes mentioned under B) and their preparation have already been described in German Patent Application P 3,737,921.6.

They are prepared by reacting one or more dialkylaminoorganyldichlorosilanes of the formula $RSiCl_2-NR'R'$, in which R is $C_1-C_4$-alkyl, vinyl or phenyl and R' is $C_1-C_4$-alkyl, with at least 3.35 mols of ammonia per mol of silane in a solvent at temperatures of $-80°$ C. to $+70°$ C. Preferably R is methyl, ethyl, vinyl or phenyl and R' is methyl. In particular, R is ethyl and R' is methyl.

The dialkylaminoorganyldichlorosilanes $RSiCl_2-NR'R'$ (also designated as "aminochlorosilanes" below) employed as starting materials for these polysilazanes can obtained by the method of S. S. Washburne and W. R. Peterson, J. Organometal. Chem. 21 (1970), page 59, as follows:

One or more organyltrichlorosilanes $RSiCl_3$ where R represents alkyl groups having 1 to 4 carbon atoms, or vinyl or phenyl, are reacted with dialkylamine $HNR'R'$, where R' represents alkyl groups having 1 to 4 carbon atoms. The reaction is carried out in aprotic solvents, preferably polar solvents such as ethers, in particular in THF.

The molar ratio of organyltrichlorosilane to dialkylamine can assume values between 1:1 and 1:3, a ratio of about 1:2 being preferred.

The ammonium salts formed during the reaction precipitate from the reaction solution, while the aminochlorosilanes formed remain in solution.

The aminochlorosilanes of the formula RSiCl$_2$—NR'R' obtained are reacted with at least 3.35 mols, preferably with at least 3.5 mols, of ammonia per mol in aprotic solvents, preferably polar solvents such as ethers, in particular THF. This reaction takes place at temperatures between +80° C. and +70° C., preferably at −10° C. to 0° C.

The resulting polysilazanes dissolve completely in all common aprotic solvents. They have the following structural units:

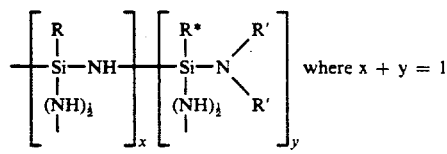

where x + y = 1 where the same radicals are suitable for R* as for R, but R and R* can be identical or different (different if more than one aminochlorosilane is reacted with NH$_3$).

Values of x=0.7–0.95 (y=0.3–0.05) are obtained here if at least 3.35 mols of NH$_3$ are used per mol of aminochlorosilane. Preferably, x=0.85–0.95 (y=0.15–0.05); this is the case if at least 3.5 mols of NH$_3$ are used per mol of aminochlorosilane. In general, at most 8 mols, preferably at most 6 mols of NH$_3$ are used per mol of aminochlorosilane. Of course, the reaction also proceeds successfully with a relative amount of NH$_3$ greater than 8 mols, but this higher outlay is superfluous.

In the above formula of the polysilazanes as in B), R and R* are vinyl or phenyl and R' is C$_1$-C$_4$-alkyl, preferably R and R* are methyl, ethyl, vinyl or phenyl and R' is methyl; particularly preferentially R and R* are ethyl and R' is methyl.

The above completes the description of the preparation of the polysilazanes employed in the process according to the invention.

Sinter aids used in the production of the sinterable ceramic powder according to the invention are in general one or more of the following substances: alkaline earth elements, Al, Y, rare earth elements, Ti, Zr, Hf, Nb, Ta and Cr, specifically in the form of their oxides, alcoholates, nitrates, acetates, acetylacetonates, carbonates, oxalates or halides. Among the substances mentioned, the oxides of Mg, Al, Y, Dy, Ho, Er, Tm, Yb, Ti, Zr and Hf are preferred. The oxides of Mg, Al, Y, Yb and Ti are particularly preferred.

The amount of sinter aid is preferably 0.02 to 0.2 mol per 100 g of polysilazane.

The polysilazane is first melted or dissolved in an organic solvent. Tetrahydrofuran (THF), toluene or hexane is preferably used. The powdered sinter aid is suspended in this melt or solution. In order to improve the dispersion of the solid particles, an ultrasonic treatment of the suspension can subsequently be carried out. The homogeneous deposition of the polymer on the solid particles is effected by slowly cooling the melt or slowly evaporating the solvent at normal pressure or reduced pressure. The substance thus obtained is then pyrolysed at 500°-1600° C., preferably 800°-1200° C., in a protective gas atmosphere. The protective gas used is preferably N$_2$, Ar, NH$_3$ or H$_2$ or a mixture of these gases, in particular N$_2$, Ar or NH$_3$ or their mixtures.

Si$_3$N$_4$ or Si$_3$N$_4$—SiC sintered articles can be produced from the ceramic powder thus obtained, by grinding the powder in a aprotic solvent, if appropriate sieving, forming a molded article therefrom and sintering this.

The invention therefore further relates to a process for the production of a silicon nitride ceramic, which comprises melting a polysilazane or dissolving it in an organic solvent, suspending a powdered sinter aid in this melt or solution, then pyrolysing the melt, or the residue obtained after evaporation of the solvent, at 500° to 1600° C. in a protective gas atmosphere, grinding in an aprotic solvent, forming a molded article from the ground product and sintering this at 1700°-2000° C. in an N$_2$ atmosphere at 1 to 150 bars, the polysilazane either A) being obtainable by reacting at least one of the oligosilazanes of the formula (I)

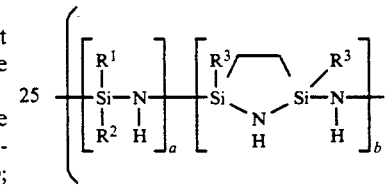

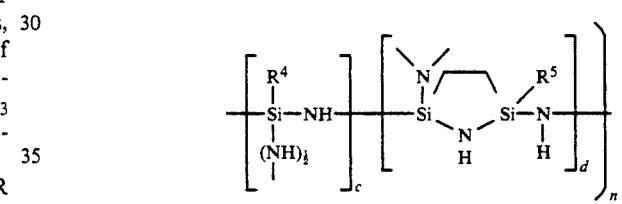

in which a, b, c and d are the mole fractions of the respective structural units and $0 \leq a \leq 1$, $0 \leq b \leq 1$, $0 \leq c < 0.7$, $0 \leq d < 0.7$, $0.3 \leq a+b$, $c+d < 0.7$ and n is approximately 2 to approximately 12, with at least one of the chlorosilanes R$^6$R$^7$SiCl$_2$, R$^8$SiCl$_3$, Cl$_2$R$^9$Si—CH$_2$CH$_2$—SiR$^9$Cl$_2$ and Cl$_3$Si—CH$_2$CH$_2$—SiR$^{10}$Cl$_2$ at 30° to 300° C., where, independently of one another, R$^1$, R$^2$, R$^4$, R$^6$, R$^7$ and R$^8$ are H, C$_1$—C$_6$-alkyl or C$_2$-C$_6$-alkenyl and R$^3$, R$^5$, R$^9$ and R$^{10}$ are C$_1$-C$_6$-alkyl or C$_2$-C$_6$-alkenyl, or B) having the following formula

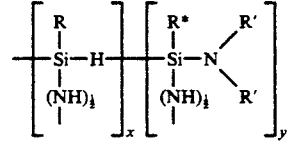

in which R and R* can be identical or different and R and R* are C$_1$-C$_4$-alkyl, vinyl or phenyl and R' is C$_1$-C$_4$-alkyl and x and y are the mole fractions of the two structural units, where x+y=1 and x=0.7–0.95.

An Si$_3$N$_4$ or Si$_3$N$_4$-SiC sintered article can also be produced, however, by first proceeding as in the production of the ceramic powder according to the invention, but not yet pyrolysing the solidified melt or the residue obtained after evaporation of the solvent, but first forming a moulded article therefrom and then pyrolysing and sintering this.

The invention therefore further relates to a process for the production of a silicon nitride ceramic, which comprises melting a polysilazane or dissolving it in an organic solvent, suspending a powdered sinter aid in this melt or solution, then allowing the melt to solidify or evaporating the solvent, forming a molded article from the product obtained, pyrolysing this at 500° to 1600° C. in a protective gas atmosphere and then sintering it at 1750° to 2000° C. in an $N_2$ atmosphere at 1 to 150 bars, the polysilazane either A) being obtainable by reacting at least one of the oligosilazanes of the formula (I)

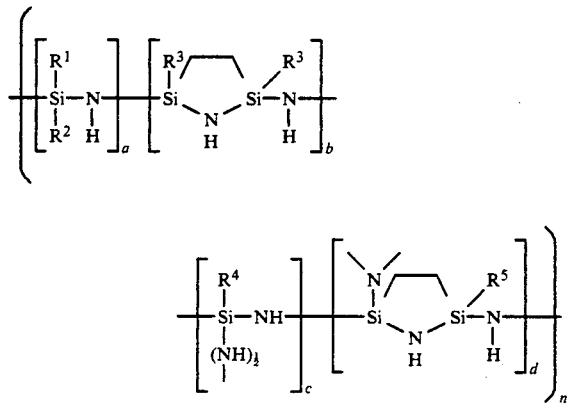

in which a, b, c and d are the mole fractions of the respective structural units and $0 \leq a \leq 1$, $0 \leq b \leq 1$, $0 \leq c < 0.7$, $0 \leq d < 0.7$, $0.3 \leq a+b$, $c+d < 0.7$ and n is approximately 2 to approximately 12, with at least one of the chlorosilanes $R^6R^7SiCl_2$, $R^8SiCl_3$, $Cl_2R^9Si$—$CH_2CH_2$—$SiR^9Cl_2$ and $Cl_3Si$—$CH_2CH_2$—$SiR^{10}Cl_2$ at 30° to 300° C., where, independently of one another, $R^1$, $R^2$, $R^4$, $R^6$, $R^7$ and $R^8$ are H, $C_1$-$C_6$-alkyl or $C_2$-$C_6$-alkenyl and $R^3$, $R^5$, $R^9$ and $R^{10}$ are $C_1$-$C_6$-alkyl or $C_2$-$C_6$-alkenyl, or B) having the following formula

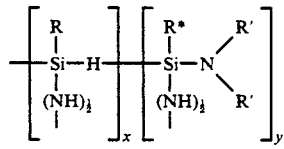

in which R and R* can be identical or different and R and R* are $C_1$-$C_4$-alkyl, vinyl or phenyl and R' is $C_1$-$C_4$-alkyl and x and y are the mole fractions of the two structural units, where $x+y=1$ and $x=0.7-0.95$.

With both methods for producing a silicon nitride ceramic, the sintering is preferably carried out at 1700°-1850° C. in an $N_2$ atmosphere at 1-10 bars.

The maximum SiC content of the pyrolysed product to be expected on the basis of the elemental composition of the polysilazane is 22% by weight if the total content reacts to give $Si_3N_4$. However, during pyrolysis under Ar or $N_2$ at up to 1000° C. elemental carbon is additionally formed. At the higher temperatures which are used, in particular, in the subsequent sintering, this reacts with a part of the initially formed $Si_3N_4$ with the formation of SiC and $N_2$. For this reason, the sintered articles which are produced by means of pyrolysis under Ar or $N_2$ have SiC contents of acre than 22% by weight, at most 43% by weight. On the other hand, pure $Si_3N_4$ is formed in the pyrolysis of the polysilazane under an $NH_3$ atmosphere. In this manner, SiC contents can be adjusted to between 0 and 43% by weight in the $Si_3N_4$/SiC sintered articles, depending on the choice of the pyrolysis atmosphere ($NH_3$, $N_2$, $H_2$, Ar or their mixtures).

The characteristic feature of the structure of the $Si_3N_4$/SiC composite is that the grain growth of the $Si_3N_4$ matrix is strongly inhibited owing to the dispersed SiC particles. The $Si_3N_4$ grains have an elongated grain shape with grain diameters less than 1 $\mu$m and a ratio of grain length:grain diameter=5:1 to 10:1. The mean grain diameter of the approximately equiaxial SiC grains is less than 0.8 $\mu$m.

The sinterable ceramic powder produced according to the invention contains 40-55% by weight of Si, 0.05-25% by weight of C, 10-35% by weight of N, 5-15% by weight of O and 2-10% by weight of one or more of the elements Mg, Al, Y, Dy, Ho, Er, Tm, Yb, Ti, Zr and Hf, all the elements mentioned being homogeneously distributed in the powder particles and, in particular, Si, C and N being bound as amorphous material. The preferred elements among those present in addition to Si, C, N and O are Mg, Al, Y, Dy, Ho, Er, Tm, Yb, Ti, Zr and Hf. Mg, Al, Y, Yb and Ti are particularly suitable, especially in a content of 2-10% by weight in the sinterable ceramic powder.

A content of 5 to 25% by weight of C is further preferred, which, as mentioned above, can be adjusted by means of the composition of the protective gas in the pyrolysis.

The silicon nitride ceramic produced according to the invention is very dense, with a maximum porosity of 3%. Preferably, it consists to 10-60% by weight of crystalline SiC, to 35-85% by weight of crystalline $Si_3N_4$ and to 3-20% by weight of an amorphous or partially crystalline intergranular phase, which contains the sinter additives and oxygen. The composition can again be controlled by the composition of the protective gas in the pyrolysis.

The silicon nitride ceramic according to the invention can be used for the production of components subject to severe mechanical, thermal and corrosive stress.

EXAMPLE 1 a) Production of a sinterable ceramic powder 100 g of the polychlorosilazane of the formula

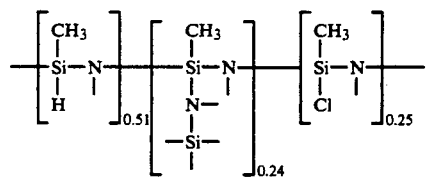

are melted at 150° C. under argon into a one-necked flask fitted with a tap. This polysilazane had been prepared from the oligosilazane

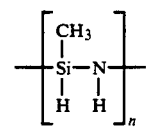

(formula I where a=1, b=c=d=0, R$^1$=CH$_3$, R$^2$=H) and the chlorosilane (CH$_3$)HSiCl$_2$ in a molar ratio of 1:0.7.

8.9 g of Al$_2$O$_3$ and 4.0 g of Y$_2$O$_3$ were suspended in the melt. Following subsequent ultrasonic treatment, the material was treated at 200° C. with NH$_3$ for 10 h. After cooling, the residue was ground and then pyrolysed under a stream of argon in a quartz tube fitted with a tap. The heating rate was 4K/min up to 550° C. As decomposition occurs at this temperature, a holding time of 120 min was inserted. In order to complete the pyrolysis, the pyrolysed product was heated to 1000° C. at a heating rate of 4K/min and held there for 60 min. An amorphous (X-ray analysis) residue, consisting of 84% by weight of pyrolysed product, 11% by weight of Al$_2$O$_3$ and 5% by weight of Y$_2$O$_3$ was obtained which according to elementary analysis had the following composition (in % by weight):

Si 50.6%, C 11.1%, N 19.8%, O 8.5%, Al 5.9%, Y 4.1%

The pyrolysed product obtained was triturated in n-hexane for 3 h. In this way, the agglomerates formed during the pyrolysis were broken down. The triturated pyrolysed product had a mean particle size of 0.7 μm and a BET surface area of 20 m$^2$/g.

b) Production of a mixed ceramic The sinterable ceramic powder just produced was sieved (mesh width d=160 μm), compressed by cold isostatic pressing at 640 MPa and sintered. The sintering of the compact (diameter=10 mm, height=12 mm) was carried out without pressure under static nitrogen using a heating rate of 20K/min up to 1750° C. and a holding time of 60 min. The sinter density was 3.23 g/cm$^3$, corresponding to 97% of theory, on the assumption of a theoretical density of 3.33 g/cm$^3$. An SiC proportion of 24% by weight in the sintered Si$_3$N$_4$/SiC body was found by determination of the C content by elementary analysis. The structure of the composite had mean grain sizes of 0.4 μm. The maximum grain sizes were about 1 μm.

EXAMPLE 2

Production of a sinterable ceramic powder and subsequent production of a mixed ceramic. The polychlorosilazane mentioned in Example 1 was employed, but was processed not in the melt, but in solution.

100 g of the polychlorosilazane were dissolved in 300 ml of THF. 8.9 g of Al$_2$O$_3$ and 4.0 g of Y$_2$O$_3$ were suspended in this solution. Following subsequent ultrasonic treatment, the THF was distilled off, with vigorous stirring, at 20° C. and 10$^{-2}$ mbar. powdery residue remained. The residue was then treated further in the same may as in Example 1. In this way, within narrow limits, the same results as in Example I were produced.

EXAMPLE 3 a) Production of a sinterable ceramic powder 100 g of the polychlorosilazane mentioned in Example 1 were melted at 150° C. under protective gas in a one-necked flask fitted with a tap. 8.9 g of Al$_2$O$_3$ and 4.0 g of Y$_2$O$_3$ were suspended in this melt. Following subsequent ultrasonic treatment, the mixture was cooled and the glassy, brittle residue was ground. The resulting powder was pyrolysed under a stream of NH$_3$ in a quartz tube fitted with a tap.

The heating rate was 2K/min up to the final temperature of 1000° C., which was held for 60 min. An amorphous (X-ray analysis) residue was obtained, consisting of 80% by weight of pyrolysed products, 14% by weight of Al$_2$O$_3$ and 6% by weight of Y$_2$O$_3$ with the following composition (in % by weight) according to elementary analysis:

Si 46.2%, C 0.9%, N 30.8%, O 10.1%, Al 7.3%, Y 4.5%

The pyrolysed product obtained was triturated in n-hexane for 3 h. In this way, the agglomerates formed during the pyrolysis were broken up. The triturated pyrolysed product had a mean particle size of 0.6 μm and a BET surface area of 20 m$^2$/g.

b) Production of a silicon nitride ceramic

The procedure was analogous to Example 1. The ceramic had the following measured values:

Sinter density: 3.29 g/cm$^3$, corresponding to 98% of theory (theoretical density: 3.35 g/cm$^3$)

Si$_3$N$_4$ proportion: 77%

Mean grain size: 0.3 μm

EXAMPLE 4 a) Production of a sinterable ceramic powder 100 g of a polysilazane of the formula

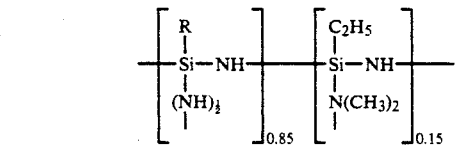

which had been produced from C$_2$H$_5$SiCl$_3$+2HN(CH$_3$)$_2$+3.5 NH$_3$ were melted at 80° C. under protective gas in a one-necked flask fitted with a tap. 8 g of Al$_2$O$_3$ and 4 g of Y$_2$O$_3$ were suspended in this melt, and the suspension was additionally irradiated with ultrasound for 30 min. The temperature was then increased to 180° C. and the polysilazane had hardened completely after about 3 h. The mixture was allowed to cool and the brittle glassy material was ground. It was pyrolysed in a gas-tight alumina tube under a stream of argon. The heating rate was 2K/min up to the final temperature of 1200° C. An amorphous (X-ray analysis) residue was obtained, consisting of 85% by weight of pyrolysed product, 10% by weight of Al$_2$O$_3$ and 5% by weight of Y$_2$O$_3$ with the following composition (in % by weight) according to elementary analysis:

Si 46.6%, C 18.5%, N 19.1%, O 6.5%, Al 5.1%, Y 4.2%

The pyrolysed product obtained was triturated in n-hexane for 3 h. In this way, the agglomerates formed during the pyrolysis were broken up. The triturated pyrolysed product had a mean particle size of 0.7 μm and a BET surface area of 18 m$^2$/g.

b) Production of a ceramic containing silicon nitrite

The procedure was analogous to Example 1. The ceramic had the following measured values:

Sinter density: 3.25 g/cm$^3$, corresponding to 98% of theory (theoretical density: 3.30 g/cm$^3$)

Si$_3$N$_4$ proportion: 48%

Mean grain size: 0.5 μm

EXAMPLE 5

In this example, the polysilazane mentioned in Example 4 was employed, but it was processed in solution instead of in the melt.

For this purpose, 100 g of the polysilazane were dissolved in 300 ml of THF, the sinter aids were suspended, the THF was distilled off and the polysilazane was allowed to harden completely at 180° C.

The subsequent procedure corresponded to that mentioned in Example 4. The ceramic obtained had, within narrow limits, the same properties as those obtained in Example 4.

EXAMPLE 6 a) Production of sinterable ceramic powder The polysilazane mentioned in Example 4 was again used. The mixture corresponded to Example 4, only it was pyrolysed in $NH_3$ (analogous to Example 3). The heating rate was 2K/min, and the final temperature was 1100° C. The proportion of the pyrolysed product was 83%, and that of the $Y_2O_3$ and the $Al_2O_3$ was determined as 6 and 11% respectively. Composition (in % by weight) according to elementary analysis:

Si 48.7%, C 0.8%, N 32.5%, O 7.9%, Al 5.7%, Y 4.3% b) Production of a silicon nitride ceramic

The procedure was analogous to Example 1. The ceramic had the following measured values:

Sinter density: 3.19 g/cm$^3$, corresponding to 97% of theory (theoretical density: 3.29 g/cm$^3$)

$Si_3N_4$ proportion: 80%

Mean grain size: 0.4 μm

EXAMPLE 7

The procedure was carried out analogously to Example 1 in the melt, but with the following substances: 100 g of the polysilazane $$\left[\begin{array}{c} CH_3 \\ | \\ -Si-NH- \\ | \\ H \end{array}\right]_{0.38} \left[\begin{array}{c} H_3C \diagup\diagdown CH_3 \\ \diagdown Si \diagup \diagdown Si-NH- \\ N \\ | \\ H \end{array}\right]_{0.19} \left[\begin{array}{c} CH_3 \\ | \\ -Si-N- \\ | \\ Cl \end{array}\right]_{0.43}$$

8 g of $Al_2O_3$ and 4 g of $Y_2O_3$.

The polychlorosilazane had been prepared from the oligosilazane $$\left[\begin{array}{c} CH_3 \\ | \\ -Si-N- \\ | \ | \\ H \ H \end{array}\right]_{0.67} \left[\begin{array}{c} CH_3 \diagup\diagdown CH_3 \\ \diagdown Si \diagup \diagdown Si-N- \\ N \\ | \\ H \end{array}\right]_{0.33}$$

(Formula I where a=0.67, b=0.33, c=d=0, $R^1$=$R^2$=$CH_3$, $R^2$=H) and the chlorosilane $CH_3SiCl_3$ in a molar ratio of 1:0.55.

Composition (in % by weight) according to elemental analysis:

Si 43.2%, C 21.1%, N 19.4%, O 7.3%, Al 5.8%, Y 3.5%.

Mean particle size: 0.7 μm, BET surface area: 17 m$^2$/g

Sinter density: 2.38 g/cm$^3$, corresponding to 96% of the theoretical density (2.48 g/cm$^3$)

SiC proportion: 20%

Mean grain size: 0.5 μm

EXAMPLE 8

The procedure was carried out in solution analogously to Example 2, but with the substances as in Example 7. The results corresponded within narrow limits to those mentioned in Example 7.

EXAMPLE 9

The procedure was carried out analogously to Example 3 (pyrolysis in $NH_3$), but with the substances mentioned in Example 7.

Composition (in % by weight) according to elementary analysis:

Si 49.2%, C 1.0%, N 31.2%, O 8.2%, Al 5.8%, Y 3.5%.

Mean particle size: 0.8 μm, BET surface area: 19 m$^2$/g

Sinter density: 3.23 g/cm$^3$, corresponding to 98% of the theoretical density: (3.30 g/cm$^3$)

$Si_3N_4$ proportion: 78%

Mean grain size: 0.4 μm

EXAMPLE 10

The procedure was carried out in the melt analogously to Example 1, but with the following substances: 100 g of the polychlorosilazane $$\left[\begin{array}{c} CH_3 \\ | \\ -Si-N- \\ | \ | \\ H \ H \end{array}\right]_{0.22} \left[\begin{array}{c} CH_3 \diagup\diagdown CH_3 \\ \diagdown Si \diagup \diagdown Si-NH- \\ N \\ | \\ H \end{array}\right]_{0.56} \left[\begin{array}{c} CH_3 \ CH_3 \\ | \quad | \\ -Si-CH_2-Si-N- \\ | \quad | \\ Cl \quad Cl \end{array}\right]_{0.12} \left[\begin{array}{c} \diagup \\ -Si-N- \\ | \\ Cl \end{array}\right]_{0.1}$$

8 g of $Al_2O_3$ and 4 g of $Y_2O_3$. The polychlorosilazane had been prepared from the oligosilazane $$\left[\begin{array}{c} CH_3 \\ | \\ -Si-N- \\ | \ | \\ H \ H \end{array}\right]_{0.4} \left[\begin{array}{c} CH_3 \diagup\diagdown CH_3 \\ \diagdown Si \diagup \diagdown Si-N- \\ N \\ | \\ H \end{array}\right]_{0.6}$$

(Formula I with a=0.4, b=0.6, c=d=0, $R^1$=$R^3$=$CH_3$, $R^2$=H) and the chlorosilanes $Cl_2(CH_3)Si$—$CH_2CH_2$—$Si(CH_3)Cl_3$+$C_2H_5SiCl_3$ in a molar ratio of 1:0.2:0.1.

Composition (in % by weight) according to elementary analysis:

Si 41.4%, C 21.5%, N 17.9%, O 8.9%, Al 6.2%, Y 3.5%.

Mean particle size: 0.9 μm, BET surface area: 16 m$^2$/g

Sinter density: 3.11 g/cm$^3$, corresponding to 97% of the theoretical density: (3.20 g/cm$^3$)

$Si_3N_4$ proportion: 44%, SiC proportion: 21%

Mean grain size: 0.5 μm

EXAMPLE 11

The procedure was carried out in solution analogously to Example 2, but with the substances mentioned in Example 10. The results corresponded within narrow limits to those mentioned in Example 10.

The procedure was carried out analogously to Example 3 (pyrolysis in NH₃), but with the substances mentioned in Example 10.

Composition (in % by weight) according to elementary analysis:
Si 48.8%, C 1.7%, N 30.1%, O 8.4%, Al 6.7%, Y 4.1%.

Mean particle size: 0.8 μm, BET surface area: 17 m²/g

Sinter density: 3.28 g/cm³, corresponding to 98% of the
theoretical density: (3.35 g/cm³)
Si₃N₄ proportion: 75%, SiC proportion: 5.5%
Mean grain size: 0.4 μm

EXAMPLE 13

The procedure was carried out in the melt analogously to Example 1, but with the following substances: 100 g of the polysilazane

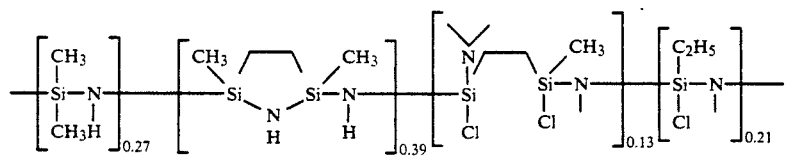

8 g of Al₂O₃ and 4 g of Y₂O₃.

The polychlorosilazane had been prepared from the oligosilazane

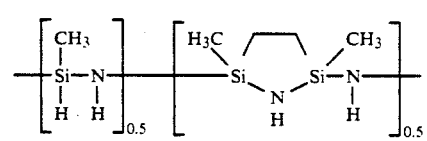

(Formula I with a=0.5, b=0.5, c=d=0, R¹=R³=CH₃, R²=H) and the chlorosilanes Cl₃Si—CH₂CH₂—Si(CH₃)Cl₂+C₂H₅SiCl₃ in a molar ratio of 1:0.15:0.25.

Composition (in % by weight) according to elementary analysis:
Si 34.2%, C 21.2%, N 17.4%, O 10.2%, Al 7.8%, Y 5.1%.

Mean particle size: 0.9 μm, BET surface area: 16 m²/g
Sinter density: 3.00 g/cm³, corresponding to 96% of the theoretical density: (3.13 g/cm³)
Si₃N₄ proportion: 43.5%, SiC proportion: 11.6%
Mean grain size: 0.5 μm

EXAMPLE 14

The procedure was carried analogously to Example 2, but with the substances mentioned in Example 13. The results corresponded within narrow limits to those mentioned in Example 13.

EXAMPLE 15

The procedure was carried out analogously to Example 3 (pyrolysis in NH₃), but with the substances mentioned in Example 13.

Composition (in % by weight) according to elementary analysis:
Si 47.1%, C 0.9%, N 33.0%, O 9.8%, Al 6.5%, Y 4.1%.

Mean particle size: 0.7 μm, BET surface area: 19 m²/g

Sinter density: 3.25 g/cm³, corresponding to 98% of the theoretical density: (3.32 g/cm³)
Si₃N₄ proportion: 78.5%,
Mean grain size: 0.4 μm

EXAMPLE 16

The procedure was carried out analogously to Example 3 (pyrolysis in NH₃), but with the following substances: 50 g of polysilazane 1 of the following formula (prepared as in Example 7):

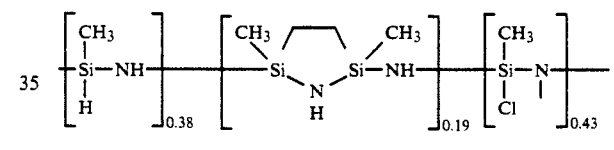

and 50 g of polysilazane 2 of the following formula

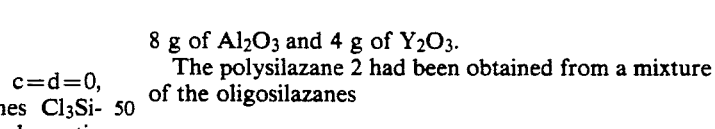

8 g of Al₂O₃ and 4 g of Y₂O₃.

The polysilazane 2 had been obtained from a mixture of the oligosilazanes

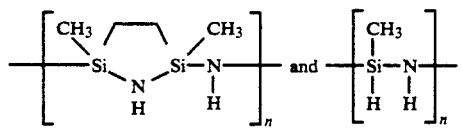

(molar ratio 2:1) and the chlorosilane (CH₃)HSiCl₂ in a molar ratio of 1:0.55.

Composition (in % by weight) according to elementary analysis
Si 46.4%, C 0.6%, N 30.8%, O 9.4%, Al 7.7%, Y 4.6%.

Mean particle size: 0.6 μm, BET surface area: 19 m²/g
Sinter density: 3.29 g/cm³, corresponding to 98% of the theoretical density: (3.36 g/cm³)
Si₃N₄ proportion: 77%, Mean grain size: 0.4 μm.

We claim:

1. A process for the production of a sinterable ceramic powder, which comprises melting a polysilazane or dissolving it in an organic solvent, suspending a powdered sinter aid in this melt or solution, then pyrolysing the melt, or the residue obtained after evaporation of the solvent, at 500° to 1600° C. in a protective gas atmosphere, the polysilazane either A) being obtainable by reacting at least one of the oligosilazanes of the formula (I)

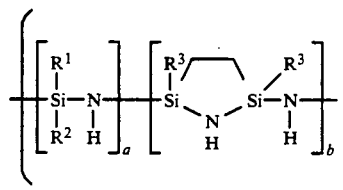

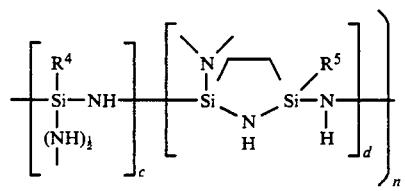

in which a, b, c and d are the mole fractions of the respective structural units and where $0 \leq a \leq 1$, $0 \leq b \leq 1$, $0 \leq c < 0.7$, $0 \leq d < 0.7$, $0.3 \leq a+b$, $c+d < 0.7$ and n is approximately 2 to approximately 12, with at least one of the chlorosilanes $R^6R^7SiCl_2$, $R^8SiCl_3$, $Cl_2R^9Si-CH_2CH_2-SiR^9Cl_2$ and $Cl_3Si-CH_2CH_2-SiR^{10}Cl_2$ at 30° to 300° C., where, independently of one another, $R^1$, $R^2$, $R^4$, $R^6$, $R^7$ and $R^8$ are H, $C_1-C_6$-alkyl or $C_2-C_6$-alkenyl and $R^3$, $R^5$, $R^9$ and $R^{10}$ are $C_1-C_6$-alkyl or $C_2-C_6$-alkenyl, or B) having the following formula

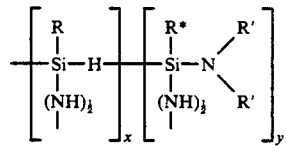

in which R and R* can be identical or different and R and R* are $C_1-C_4$-alkyl, vinyl or phenyl and R' is $C_1-C_4$-alkyl and x and y are the mole fractions of the two structural units, where $x+y=1$ and $x=0.7-0.95$.

2. Process for the production of a silicon nitride ceramic, which comprises melting a polysilazane or dissolving it in an organic solvent, suspending a powdered sinter aid in this melt or solution, then pyrolysing the melt, or the residue obtained after evaporation of the solvent, at 500° to 1600° C. in a protective gas atmosphere, grinding in an aprotic solvent, forming a molded article from the ground product and sintering this at 1700°-2000° C. in an $N_2$ atmosphere at 1 to 150 bars, the polysilazane either A) being obtainable by reacting at least one of the oligosilazanes of the formula (I)

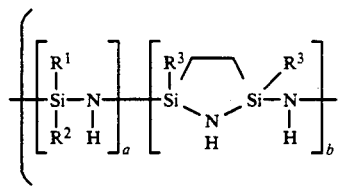

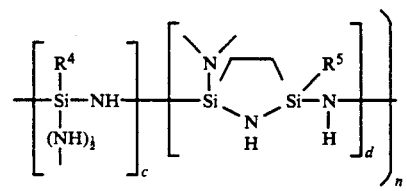

in which a, b, c and d are the mole fractions of the respective structural units and where $0 \leq a \leq 1$, $0 \leq b \leq 1$, $0 \leq c < 0.7$, $0 \leq d < 0.7$, $0.3 \leq a+b$, $c+d < 0.7$ and n is approximately 2 to approximately 12, with at least one of the chlorosilanes $R^6R^7SiCl_2$, $R^8SiCl_3$, $Cl_2R^9Si-CH_2CH_2-SiR^9Cl_2$ and $Cl_3Si-CH_2CH_2-SiR^{10}Cl_2$ at 30° to 300° C., where, independently of one another, $R^1$, $R^2$, $R^4$, $R^6$, $R^7$ and $R^8$ are H, $C_1-C_6$-alkyl or $C_2-C_6$-alkenyl and $R^3$, $R^5$, $R^9$ and $R^{10}$ are $C_1-C_6$-alkyl or $C_2-C_6$-alkenyl, or B) having the following formula

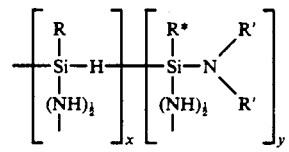

in which R and R* can be identical or different and R and R* are $C_1-C_4$-alkyl, vinyl or phenyl and R' is $C_1-C_4$-alkyl and x and y are the mole fractions of the two structural units, where $x+y=1$ and $x=0.7\approx0.95$.

3. A process for the production of a silicon nitride ceramic, which comprises melting a polysilazane or dissolving it in an organic solvent, suspending a powdered sinter aid in this melt or solution, then allowing the melt to solidify or evaporating the solvent, forming a molded article from the product obtained, pyrolysing this at 500° to 1600° C. in a protective gas atmosphere and then sintering it at 1750° to 2000° C. in an $N_2$ atmosphere at 1 to 150 bar, the polysilazane either A) being obtainable by reacting at least one of the oligosilazanes of the formula (I)

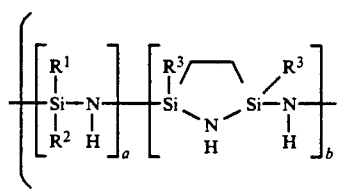

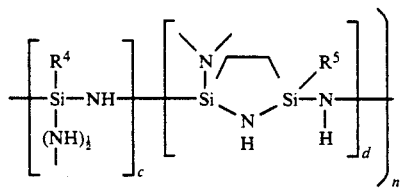

in which a, b, c and d are the mole fractions of the respective structural units and where $0 \leq a \leq 1$, $0 \leq b \leq 1$, $0 \leq c < 0.7$, $0 \leq d < 0.7$, $0.3 \leq a+b$, $c+d < 0.7$ and n is approximately 2 to approximately 12, with at least one of the chlorosilanes $R^6R^7SiCl_2$, $R^8SiCl_3$, $Cl_2R^9Si-CH_2CH_2-SiR^9Cl_2$ and $Cl_3Si-CH_2CH_2-SiR^{10}Cl_2$ at 30° to 300° C., where, independently of one another, $R^1$, $R^2$, $R^4$, $R^6$, $R^7$ and $R^8$ are H, $C_1$-$C_6$-alkyl or $C_2$-$C_6$-alkenyl and $R^3$, $R^5$, $R^9$ and $R^{10}$ are $C_1$-$C_6$-alkyl or $C_2$-$C_6$-alkenyl, or B) having the following formula

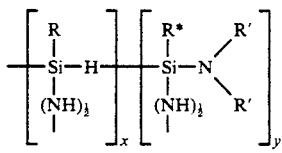

in which R and R* can be identical or different and R and R* are $C_1$-$C_4$-alkyl, vinyl or phenyl and R' is $C_1$-$C_4$-alkyl and x and y are the mole fractions of the two structural units, where $x+y=1$ and $x=0.7-0.95$.

4. The process as claimed in claim 2, wherein sintering is carried out at 1750° to 1850° C. in an $N_2$ atmosphere at 1 to 10 bars.

5. The process as claimed in claim 3, wherein sintering is carried out at 1750° to 1850° C. in an $N_2$ atmosphere at 1 to 10 bar.

6. The process as claimed in claim 1, wherein the pyrolysis is carried out at 800° to 1200° C.

7. The process as claimed in claim 2, wherein the pyrolysis is carried out at 800° to 1200° C.

8. The process as claimed in claim 3, wherein the pyrolysis is carried out at 800° to 1200° C.

9. The process as claimed in claim 4, wherein the pyrolysis is carried out at 800° to 1200° C.

10. The process as claimed in claim 5, wherein the pyrolysis is carried out at 800° to 1200° C.

11. The process as claimed in claim 1, wherein toluene, hexane or THF is used as the solvent for the polysilazane.

12. The process as claimed in claim 1, wherein one or more of the elements Mg, Al, Y, Dy, Ho, Er, Tm, Yb, Ti, Zr and Hf are employed in the form of their oxides, alcoholates, nitrates, acetates, acetylacetonates, carbonates, oxalates or halides as sinter aids.

13. The process as claimed in claim 12, wherein one or more of the elements Mg, Al, Y, Yb and Ti are employed in the form of their oxides.

14. The process as claimed in claim 12, wherein 0.02 to 0.2 mol of the sinter aid is employed per 100 g of polysilazane.

15. The process as claimed in claim 1, wherein $N_2$, Ar, $NH_3$ or a mixture of these gases is employed as the protective gas in the pyrolysis.

16. A sinterable ceramic powder, obtained by the process as claimed in claim 1.

17. A sinterable ceramic powder, obtained by the process as claimed in claim 6.

18. A silicon nitride ceramic, obtained by the process as claimed in claim 7.

19. A silicon nitride ceramic, obtained by the process as claimed in claim 8.

20. A silicon nitride ceramic, obtained by the process as claimed in claim 9.

21. A silicon nitride ceramic, obtained by the process as claimed in claim 10.

22. A sinterable ceramic powder, obtained by the process as claimed in claim 1, and containing 40-55% by weight of Si, 0.05-25% by weight of C, 10-35% by weight of N, 5-15% by weight of O and 2-10% by weight of one or more of the elements Mg, Al, Y, Dy, Ho, Er, Tm, Yb, Ti, Zr and Hf, all the elements mentioned being homogeneously distributed in the powder particles and Si, C and N being bound as amorphous material.

23. The sinterable ceramic powder, containing 40-55% by weight of Si, 0.05-25% by weight of C, 10-35% by weight of N, 5-15% by weight of O and 2-10% by weight of one or more of the elements Mg, Al, Y, Dy, Ho, Er, Tm, Yb, Ti, Zr and Hf, all the elements mentioned being homogeneously distributed in the powder particles and Si, C and N being bound as amorphous material.

24. The sinterable ceramic powder as claimed in claim 22, containing 2-10% by weight of one or more of the elements Mg, Al, Y, Yb and Ti.

25. The sinterable ceramic powder as claimed in claim 22, containing 5 to 25% by weight of C.

26. A dense silicon nitride ceramic having a maximum porosity of 3%, consisting essentially of 10-16% by weight of crystalline SiC, 35-85% by weight of crystalline $Si_3N_4$ and 3 to 20% by weight of amorphous or partially crystalline intergranular phase, which contains the sinter additives and oxygen, by the process as claimed in claim 2.

27. Machine components resistant to being damaged by severe mechanical, thermal and corrosive stress comprising the silicon nitride ceramic of claim 26.

28. The sinterable ceramic powder as claimed in claim 23, containing 2-10% by weight of one or more of the elements Mg, Al, Y, Yb and Ti.

* * * * *

UNITED STATES PATENT AND TRADEMARK OFFICE
CERTIFICATE OF CORRECTION

PATENT NO. : 5,162,272

DATED : November 10, 1992

INVENTOR(S) : Marcellus Peuckert et al

Page 1 of 5

It is certified that error appears in the above-indentified patent and that said Letters Patent is hereby corrected as shown below:

<u>On the Cover Page:</u> Items [75], [56] and [57]:

The co-inventor's name should read: --Martin Seher--.

The last other Publication should read: --Saiki, G., et al (II), <u>Chem. Abs.</u> 110:140358n (1989).

<u>In the Abstract</u>

In the second column, at line 9: "$0 \leq c \leq 0.7$" should read --$0 \leq C < 0.7$--.

In the second column, at line 9: "$0 \leq d \leq 0.7$" should read --$0 \leq d < 0.7$--.

In the second column, at line 10: "$c+d \leq 0.7$" should read --$c+d < 0.7$--.

In the second column, at line 19: the left-hand bracketed portion of the formula should read:

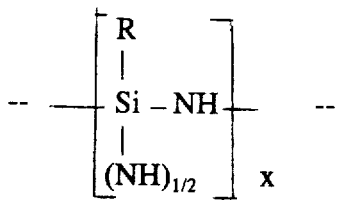

UNITED STATES PATENT AND TRADEMARK OFFICE
CERTIFICATE OF CORRECTION

PATENT NO. : 5,162,272
DATED : November 10, 1992
INVENTOR(S) : Marcellus Peuckert et al It is certified that error appears in the above-indentified patent and that said Letters Patent is hereby corrected as shown below:

At column 2, line 35, the left-hand bracketed portion of the formula should read:

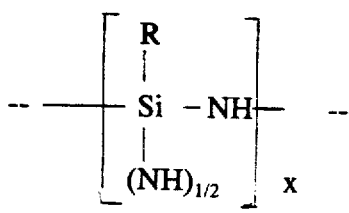

At column 3, line 45, "R⁵SiCl₂" should read --R⁵HSiCl₂--.

At column 4, line 30: "in" should read --is--.

At column 5, line 9: "+80°C" should read -- -80°C--.

At column 6, line 53, the left-hand bracketed portion of the formula should read:

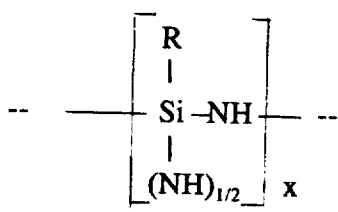

UNITED STATES PATENT AND TRADEMARK OFFICE
CERTIFICATE OF CORRECTION

PATENT NO. : 5,162,272

DATED : November 10, 1992

INVENTOR(S) : Marcellus Peuckert et al

It is certified that error appears in the above-indentified patent and that said Letters Patent is hereby corrected as shown below:

At column 7, line 32, insert --where-- between "and" and "$0 \leq a \leq 1$"..

At column 7, line 32, "$0 \leq b1$" should read --$0 \leq b \leq 1$--.

At column 7, line 45, the left-hand bracketed portion of the formula should read:

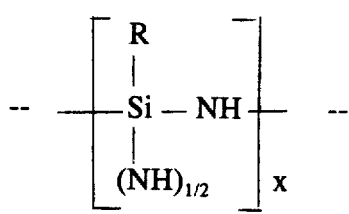

At column 7, line 59, insert --N-- between "total" and "content".

At column 7, line 67, "acre" should read --more--.

At column 9, line 52, "may" should read --way--.

At column 10, line 25, in the formula "R" should read --$C_2H_5$--.

At column 13, line 50, "$R^3=H$" should read --$R^2=H$--.

UNITED STATES PATENT AND TRADEMARK OFFICE
CERTIFICATE OF CORRECTION

PATENT NO. : 5,162,272
DATED : November 10, 1992
INVENTOR(S) : Marcellus Peuckert et al It is certified that error appears in the above-indentified patent and that said Letters Patent is hereby corrected as shown below:

In the Claims:

In claim 1, at column 15, line 48, the left-hand bracketed portion of the formula should read:

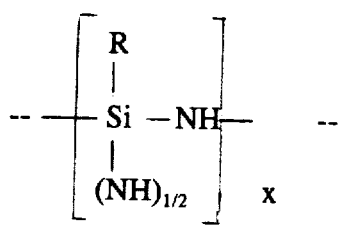

In claim 2, at column 16, line 37, the left-hand bracketed portion of the formula should read:

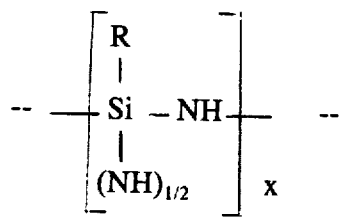

In claim 2, at column 16, line 46, "x=0.7$\stackrel{\sim}{=}$0.95" should read --x=0.7-0.95--.

UNITED STATES PATENT AND TRADEMARK OFFICE
CERTIFICATE OF CORRECTION

PATENT NO. : 5,162,272
DATED : November 10, 1992
INVENTOR(S) : Marcellus Peuckert et al It is certified that error appears in the above-indentified patent and that said Letters Patent is hereby corrected as shown below:

In claim 3, at column 17, line 27, the left-hand bracketed portion of the formula should read:

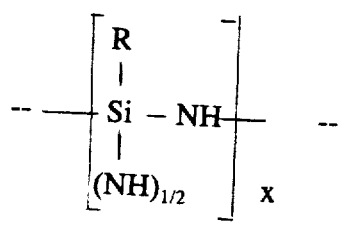

Signed and Sealed this

Fifteenth Day of March, 1994

Attest:

BRUCE LEHMAN

Attesting Officer      Commissioner of Patents and Trademarks